United States Patent Office.

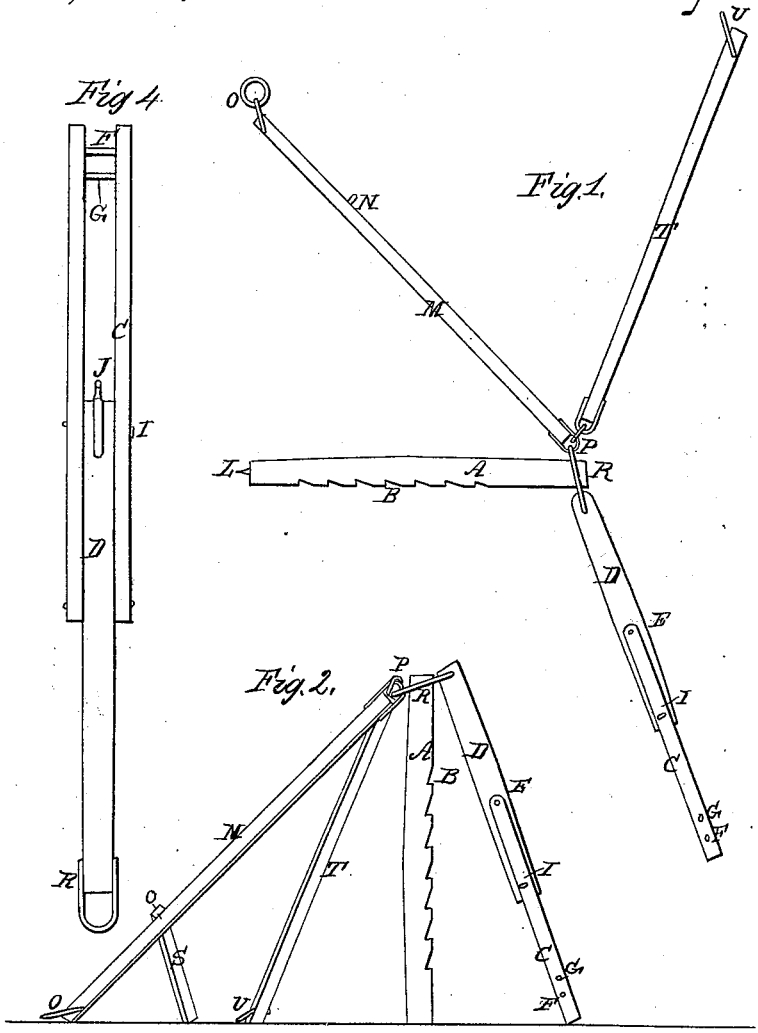

JOHN SHELDON, OF CHICAGO, ILLINOIS.

Letters Patent No. 77,541, dated May 5, 1868.

IMPROVEMENT IN DERRICK.

*The Schedule referred to in these Letters Patent and making part of the same.*

TO ALL WHOM IT MAY CONCERN:

Be it known that I, JOHN SHELDON, of Chicago, in the county of Cook, in the State of Illinois, have invented a new and useful Improvement in Derricks; and I do hereby declare that the following is a full and exact description thereof, reference being had to the accompanying drawings, and to the letters of reference marked thereon, making a part of this specification, in which—

Figure 1 is a representation of my derrick in position preparatory to being raised up.

Figure 2, a view of the same after being elevated, and before the arm is put in position for use.

Figure 3 shows the arm when elevated and supported by the brace underneath.

Figure 4, an enlarged view of the arm and brace detached from the other parts of the derrick.

This invention relates to a derrick designed more especially for stacking hay, and for general farm purposes, and for this reason is made of light material, and arranged so that it may be elevated or set in position for use by two or three persons, and without ropes and pulleys, and so that it may be shut together and occupy but little room as storage.

In order to give a correct understanding of my invention, I have marked corresponding parts with similar letters, and will now give such a detailed description as will enable others skilled in the art to make and use it.

A represents a substantial wooden standard, of suitable height, and made with a series of notches, B, on one edge, for supporting the lower end of a brace, C, which is made of two pieces of wood, pivoted to the arm D at E, and held apart at the opposite end by means of a bolt, F, having shoulders, and held fast by nuts, in the usual manner, a bolt, G, being also put in the brace near the bolt F, for raising the arm D, and for a pulley, if desired. This arm D is made of a piece of scantling, of suitable size and length, and has a hook, J, attached to its outer end, for sustaining a weight, in the usual manner, and a loop pivoted to the opposite end, of such a length as will pass around the top of standard A, and hold the ends of clevises P, attached to the upper ends of the braces M T.

The brace M is the most important, and may be made of a smaller scantling than the standard or arm, and should have a loop and ring, o, fastened to the lower end, in order that it may be securely anchored to the ground. The brace T is made similarly to the one described, but is not generally used, except when it becomes necessary to fasten the bottom of the derrick to a movable frame after being raised.

S, figs. 2 and 3, represents a notched brace, which is used for the double purpose of supporting the brace M and raising the arm D, as shown at figs. 2 and 3.

Operation.

The derrick should first be placed flat on the ground, as seen at fig. 1, the central part should then be raised up, as seen at fig. 2, at the same time pushing endwise on the arm and brace, keeping the outer end on the ground, as a brace for the standard A. After the latter is set upright, a pin, I, which has held the brace C rigidly to said arm, should be drawn out, which can be done by a hay-fork, or a pole of suitable length. The brace can now be doubled under, and the pin F set on one of the notches B, and raised up by pushing on the short brace S after a notch near its end has been locked over the pin G. This latter arrangement for raising the arm is very important for hanging up beef for dressing, and for other similar purposes. A rope may be attached to the arm A, to keep it steady, and swing it round, if desired, a pivot, L, fig. 1, being secured to the lower end of standard A for this purpose.

Having thus described my invention, I claim, and desire to secure by Letters Patent of the United States—

The general combination and arrangement of standard A, arm D, braces C and M, with brace S, substantially as and for the purpose set forth.

JOHN SHELDON.

Witnesses:
G. L. CHAPIN,
A. HAYWARD.